US010599569B2

(12) United States Patent
Blaner et al.

(10) Patent No.: US 10,599,569 B2
(45) Date of Patent: Mar. 24, 2020

(54) MAINTAINING CONSISTENCY BETWEEN ADDRESS TRANSLATIONS IN A DATA PROCESSING SYSTEM

(71) Applicant: INTERNATIONAL BUSINESS MACHINES CORPORATION, Armonk, NY (US)

(72) Inventors: Bartholomew Blaner, Underhill Center, VT (US); Jay G. Heaslip, Williston, VT (US); Robert D. Herzl, South Burlington, VT (US); Jody B. Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 15/190,497

(22) Filed: Jun. 23, 2016

(65) Prior Publication Data
US 2017/0371789 A1 Dec. 28, 2017

(51) Int. Cl.
*G06F 12/00* (2006.01)
*G06F 12/0831* (2016.01)
*G06F 12/0808* (2016.01)
*G06F 12/1027* (2016.01)
*G06F 12/1009* (2016.01)

(52) U.S. Cl.
CPC ...... *G06F 12/0831* (2013.01); *G06F 12/0808* (2013.01); *G06F 12/1009* (2013.01); *G06F 12/1027* (2013.01); *G06F 2212/621* (2013.01); *G06F 2212/68* (2013.01)

(58) Field of Classification Search
None
See application file for complete search history.

(56) References Cited

U.S. PATENT DOCUMENTS

| 5,604,879 | A | 2/1997 | Beavers et al. |
|---|---|---|---|
| 6,338,128 | B1 | 1/2002 | Chang et al. |
| 7,822,942 | B2 | 10/2010 | Corrigan et al. |
| 7,930,504 | B2 | 4/2011 | Arimilli et al. |
| 8,244,978 | B2 | 8/2012 | Kegek et al. |
| 8,751,752 | B2 | 6/2014 | Cota-Robles et al. |
| 9,170,954 | B2 | 10/2015 | Muff et al. |
| 9,619,387 | B2 | 4/2017 | Evans et al. |
| 2010/0332789 | A1* | 12/2010 | Sugumar ............ G06F 12/1027 711/207 |

(Continued)

*Primary Examiner* — Reginald G Bragdon
*Assistant Examiner* — Michael L Westbrook
(74) *Attorney, Agent, or Firm* — Michael R. Long; Nathan Rau

(57) ABSTRACT

A technique for operating a memory management unit (MMU) of a processor includes the MMU detecting that one or more address translation invalidation requests are indicated for an accelerator unit (AU). In response to detecting that the invalidation requests are indicated, the MMU issues a raise barrier request for the AU. In response to detecting a raise barrier response from the AU to the raise barrier request the MMU issues the invalidation requests to the AU. In response to detecting an address translation invalidation response from the AU to each of the invalidation requests, the MMU issues a lower barrier request to the AU. In response to detecting a lower barrier response from the AU to the lower barrier request, the MMU resumes handling address translation check-in and check-out requests received from the AU.

17 Claims, 9 Drawing Sheets

(56) References Cited

U.S. PATENT DOCUMENTS

| | | |
|---|---|---|
| 2011/0161620 A1 | 6/2011 | Kaminski et al. |
| 2014/0040560 A1 | 2/2014 | Kegel et al. |
| 2014/0164732 A1* | 6/2014 | Muff ................... G06F 12/1027 |
| | | 711/207 |
| 2015/0347301 A1 | 12/2015 | Gschwind |

* cited by examiner

Check-out Request 400: RTag | Function | Source ID | ERAT Index | EA

*FIG. 4*

Check-out Response 500: RTag | Function | Source ID | ERAT Index | Status | Control | RA

*FIG. 5*

Check-in Request 600: | RTag | Function | Source ID | ERAT Index |

FIG. 6

Check-in Response 700: | RTag | Function | Source ID | ERAT Index | Status |

FIG. 7

Raise/Lower Barrier Request 800

| RTag | Function | Source ID |
|------|----------|-----------|

*FIG. 8*

Raise/Lower Barrier Response 900

| RTag | Function | Source ID | Status |
|------|----------|-----------|--------|

*FIG. 9*

Invalidate Request 1000

| RTag | Function | Source ID | ERAT Index | Invalidate All |

*FIG. 10*

Invalidate Response 1100

| RTag | Function | Source ID | ERAT Index | Status |

*FIG. 11*

MAINTAINING CONSISTENCY BETWEEN ADDRESS TRANSLATIONS IN A DATA PROCESSING SYSTEM

BACKGROUND

The present disclosure is generally directed to techniques for maintaining consistency between address translations and, more specifically to techniques for maintaining consistency between address translations in a memory management unit and an inclusive accelerator unit of a data processing system.

A memory management unit (MMU) is a hardware unit that translates virtual memory addresses to physical memory addresses. Modern MMUs typically divide a virtual address space (i.e., the range of addresses used by a processor) into pages that each have a size that is a power of two. The least significant bits of an address (i.e., the offset within a page) define the size of a page and are left unchanged. The most significant address bits provide a virtual page number. Most MMUs implement a page table, in main memory, that includes one page table entry (PTE) per page. The PTEs are used to map virtual page numbers to physical page numbers in main memory. An associative cache of PTEs, usually referred to as a translation lookaside buffer (TLB), may be maintained in order to avoid the necessity of accessing main memory every time a virtual address requires mapping. A PTE may also include information about whether a page has been written to, when the page was last used, what kind of processes may read and write the page, and whether the page should be cached.

BRIEF SUMMARY

A technique for operating a memory management unit (MMU) of a processor includes the MMU detecting that one or more address translation invalidation requests are indicated for an accelerator unit (AU). In response to detecting that the invalidation requests are indicated, the MMU issues a raise barrier request for the AU. In response to detecting a raise barrier response from the AU to the raise barrier request, the MMU issues the invalidation requests to the AU. In response to detecting an address translation invalidation response from the AU to each of the invalidation requests, the MMU issues a lower barrier request to the AU. In response to detecting a lower barrier response from the AU to the lower barrier request, the MMU resumes handling address translation check-in and check-out requests received from the AU.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 4 is a diagram that illustrates relevant fields of an address translation check-out request (issued by the AU), configured according to an embodiment of the present disclosure;

FIG. 5 is a diagram that illustrates relevant fields of an address translation check-out response (issued by the MMU in response to the check-out request), configured according to an embodiment of the present disclosure;

FIG. 6 is a diagram that illustrates relevant fields of an address translation check-in request (issued by the AU), configured according to an embodiment of the present disclosure;

FIG. 7 is a diagram that illustrates relevant fields of an address translation check-in response (issued by the MMU in response to the check-in request), configured according to an embodiment of the present disclosure;

FIG. 8 is a diagram that illustrates relevant fields of a raise/lower barrier request (issued by the MMU), configured according to an embodiment of the present disclosure;

FIG. 9 is a diagram that illustrates relevant fields of a raise/lower barrier response (issued by the AU in response to the raise/lower barrier request), configured according to an embodiment of the present disclosure;

FIG. 10 is a diagram that illustrates relevant fields of an address translation invalidation request (issued by the MMU), configured according to an embodiment of the present disclosure;

FIG. 11 is a diagram that illustrates relevant fields of an address translation invalidation response (issued by the AU in response to the invalidation request), configured according to an embodiment of the present disclosure;

DETAILED DESCRIPTION

Figure 1:
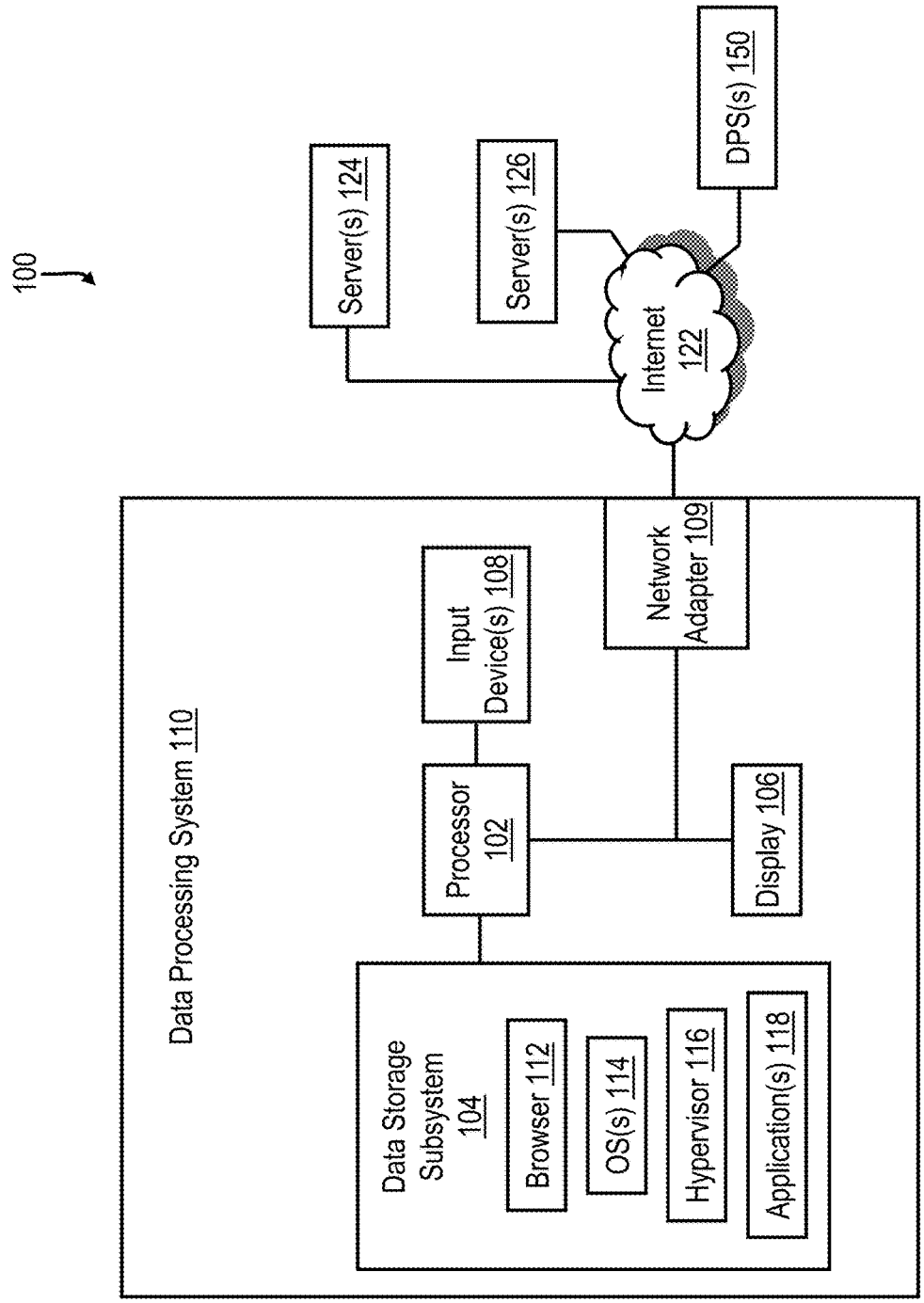
FIG. 1 is a diagram of a relevant portion of an exemplary data processing system environment that includes a simultaneous multithreading (SMT) data processing system with a processor that is configured to maintain consistency between address translations, according to the present disclosure.

The illustrative embodiments provide a method, a data processing system, and a processor configured to maintain consistency between address translations in a memory management unit (MMU) and an inclusive accelerator unit (AU) serviced by the MMU.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As used herein, the term 'accelerator unit' is synonymous with the term 'accelerator agent'. As used herein, the term 'accelerator unit' refers to an inclusive agent whose address translations (e.g., effective address (EA) to real address (RA) translations) are performed by a memory management unit (MMU) and are maintained in both the MMU and the AU.

According to an embodiment of the present disclosure, a processor includes at least one accelerator unit (AU), e.g., a compression/decompression engine or an encryption/decryption engine, that includes an effective-to-real address translation (ERAT) cache that is coupled to a fabric (e.g., an out-of-order on-chip bus) via a first bus interface unit (BIU). The processor also includes a memory management unit (MMU) that is coupled to the fabric via a second BIU.

The AU, which is inclusive to the MMU (i.e., inclusivity means that every address translation that is cached in the AU is also cached in the MMU), is configured to request effective address (EA) to real address (RA) translations from the MMU by issuing an address translation check-out request (Check-out Req) on the fabric. In response to receiving a check-out request, the MMU provides an EA to RA translation either through, for example, a translation lookaside buffer (TLB) cache lookup or a table-walk of main memory and issues an address translation check-out response (Check-out Resp) that includes a status (e.g., a clean response, a retry response, a fault, etc.) of the check-out request and an RA (assuming a clean response).

In one or more embodiments, the MMU maintains 'in use' ('InUse') status for ERAT entries in a scoreboard for the AU. When required (e.g., due to snooping an address translation invalidation request (also known as an address translation shootdown request in the art), such as a segment lookaside buffer invalidate entry (SLBIE) command or a translation lookaside buffer invalidate entry (TLBIE) command, a translation lookaside buffer (TLB) castout occurring, or a segment lookaside buffer (SLB) castout occurring), the MMU is configured to send an address translation invalidation request (Invalidation Req) to an AU to invalidate an 'InUse' ERAT entry. The AU is configured to send an address translation invalidation response (Invalidation Resp) when the AU has completed invalidating a specified ERAT entry. In one or more embodiments, an inclusive AU issues an address translation check-in request (Check-in Req) when evicting an ERAT entry. The MMU responds to the check-in request with an address translation check-in response (Check-in Resp) to acknowledge the evicted ERAT entry is no longer 'in use'. In one or more embodiments, all requests/responses are issued in the form of packets.

In general, address translation check-in requests/responses and check-out requests/responses may arrive at the MMU/AU in arbitrary order. When an invalidation is necessary, in-flight requests may result in an 'InUse' status of an ERAT entry in the AU being different from the status for the ERAT entry that is maintained in the MMU, leading to an inconsistency unless a mechanism is implemented to prevent such an occurrence. According to embodiments of the present disclosure, a barrier protocol is implemented to clear out in-flight address translation check-out requests/responses and check-in requests/responses to eliminate 'in use' uncertainty. The barrier protocol allows the MMU to raise a barrier when an address translation invalidation request is indicated, issue the invalidation request, and then lower the barrier subsequent to receiving an address translation invalidation response in order to maintain consistency between statuses of address translations, as separately maintained by the AU and the MMU.

When an ERAT entry is to be invalidated, the MMU issues a barrier raise request (Barrier Raise Req) to the AU. Upon receipt of the barrier raise request, the AU discontinues issuing new requests to the MMU (until the barrier is later lowered). According to at least one embodiment, the MMU may issue a retry response (by encoding an appropriate value in an associated status field in an address translation check-in/check-out response) to in-flight requests received at the MMU. In one or more embodiments, an AU tracks requests that receive a retry response (such that the requests can later be reissued by the AU after the barrier is lowered). In various embodiments, the AU waits for responses to all outstanding address translation check-in/check-out requests before issuing a barrier raise response (Barrier Raise Resp).

According to the present disclosure, upon receiving the barrier raise response from the AU, the MMU issues an address translation invalidation request (Invalidation Req) to the AU. The invalidation request may explicitly specify the ERAT index to invalidate or may specify that all ERAT entries are to be invalidated. According to one embodiment, the AU waits for memory accesses that are currently using an ERAT entry that is to be invalidated to complete and then invalidates the specified ERAT entry or entries. The AU then issues an address translation invalidation response (Invalidation Resp) to the MMU. In one or more embodiments, the MMU may invalidate multiple ERAT entries during a single raised barrier. In at least one embodiment, upon receiving the invalidation response from the AU, the MMU issues a barrier lower request (Barrier Lower Req) to the AU. Responsive to the barrier lower request, the AU issues a barrier lower response (Barrier Lower Resp). Following issuance of the barrier lower response, the AU may resume issuing address translation check-out/check-in requests (e.g., address translation check-out/check-in requests that are to be retried or new address translation check-out/check-in requests).

With reference to FIG. 1, an exemplary data processing environment 100 is illustrated that includes a simultaneous multithreading (SMT) data processing system 110 that is configured to maintain consistency between address translations in a memory management unit and an accelerator unit (not separately shown in FIG. 1, see FIG. 2), according to the present disclosure. Data processing system 110 may take various forms, such as workstations, laptop computer systems, notebook computer systems, desktop computer systems or servers and/or clusters thereof. Data processing system 110 includes one or more processors 102 (which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
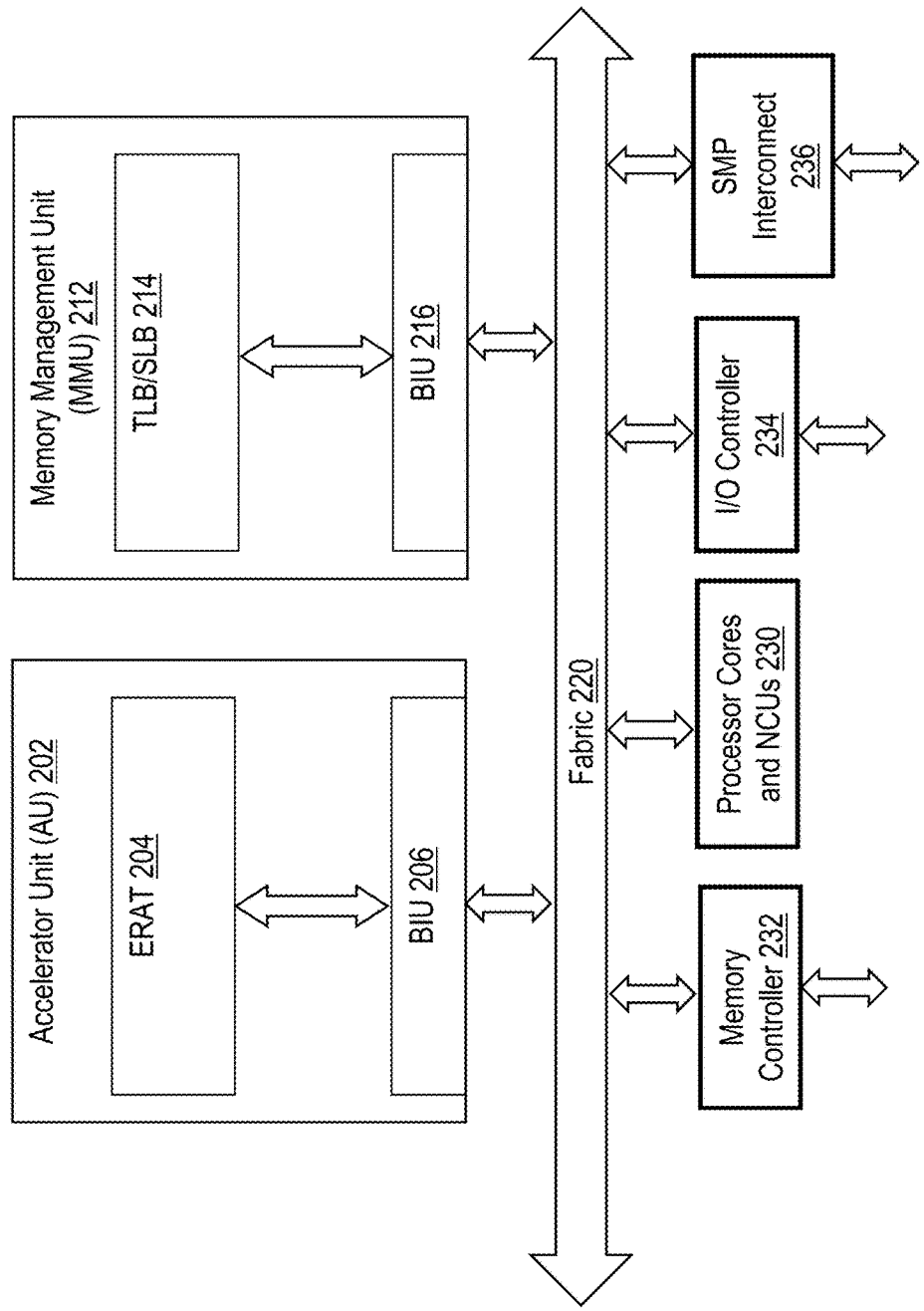
FIG. 2 is a more detailed diagram of the processor of FIG. 1 illustrating that the processor includes an accelerator unit (AU) and a memory management unit (MMU), among other components.

With reference to FIG. 2, processor 102 is further illustrated as including an accelerator unit (AU) 202 that is coupled to a memory management unit (MMU) 212, via fabric (e.g., an out-of-order on-chip bus) 220. While only one AU is illustrated it should be appreciated that a processor configured according to the present disclosure may implement one or more AUs. As is depicted, AU 202 includes an ERAT cache (ERAT) 204 that is coupled to fabric 220 via a bus interface unit (BIU) 206. MMU 212 includes a TLB cache and an SLB cache (TLB/SLB) 214 that are coupled to fabric 220 via a bus interface unit (BIU) 216. MMU 212 is configured to translate effective addresses (EAs), i.e., logical addresses, to real addresses (RAs), i.e., physical addresses, for AU 202. In various embodiments, MMU 212 is also configured to protect pages that are being translated by ensuring that only tasks with proper authorization are allowed to access the pages.

In general, MMU 212 focuses on data accesses to memory generated by loads and stores. In one or more embodiments, an address translation mechanism of MMU 212 is defined by segment descriptors and page tables, as set-up by a hypervisor. MMU 212 may communicate with various inclusive agents (only one of which is shown, i.e., AU 202) and/or non-inclusive agents (not shown) through fabric 220. In one or more embodiments, all translation protocols associated with attached agents are run over fabric 220 via data-only operations. In various embodiments, MMU 212 is also configured to interact with main memory (via memory controller 232) in order to perform table-walks and to update page tables stored in main memory, as needed. In addition, cache management instructions (e.g., SLBIE/TLBIE commands) sourced by processor cores/non-cacheable units (NCUs) 230 of processor 102 may be snooped and managed by MMU 212 on behalf of AU 202. In one or more embodiments, MMU 212 is also configured to interact with input/output (I/O) devices (via I/O controller 234) and other SMPs (via SMP interconnect 236).

MMU 212 may support a number of different address translation mechanisms, e.g., single-level translation (e.g., a hashed page table (HPT) approach), dual-level Radix translations (e.g., Radix on Radix page table approach), and single-level Radix translations (e.g., process-scoped and partition-scoped). MMU 212 may support a number of different functions, e.g., EA-to-RA translations, memory protection at segment and page levels, 4 KB, 64 KB, 2 MB, and 1 GB pages sizes for Radix translations and 4 KB, 64 KB, 16 MB, and 16 GB page sizes for HPT translations, 256 MB, and 1 TB segment sizes for HPT translations, 64-bit EAs, 68-bit virtual addresses (VAs), 56-bit real addresses (RAs), multiple (e.g. twelve) simultaneous table-walks, acquiring segment table entries (STEs) and page table entries (PTEs) from segment and page tables residing in main memory, and TLB/SLB invalidation management on behalf of inclusive AUs.

According to the present disclosure, MMU 212 supports an address translation protocol that includes a number of phases. The address translation protocol may include: an address translation check-out phase in which AU 202 requests that MMU 212 translate a given EA; an address translation check-in phase, for inclusive agents, in which upon completion of relevant processing (active eviction) or ERAT 204 castout (passive eviction) AU 202 signals that the translation is no longer in use by checking the translation back into a TLB of MMU 212; and an address translation invalidation phase, for inclusive agents, in which an entry in ERAT 204 of AU 202 is invalidated due to SLBIEs or TLBIEs snooped by MMU 212 or due to least recently used (LRU) 'castout' of an entry in SLB/TLB 214. As one example, ERAT 204 may be implemented as a 32-entry local cache arranged in a content-addressable memory/random access memory (CAM/RAM) structure.

In the HPT approach, MMU 212 may manage translation of an EA to an RA through a two-step process using tables that reside in main memory. An EA refers to an address map specific to a given process/application (e.g., a processor identifier (PID) at an operating system (OS) level). In the first layer of translation, segment tables provide a unique mapping of an EA to a larger virtual address (VA) space for a given logical partition (LPAR). To improve performance, the most recently used (MRU) segment table entries (STEs) may be cached in SLB cache in MMU 212. The second layer of translation is managed by page tables in main memory, which map the VA to a page in real/physical memory. In order to improve performance MMU 212 may also cache MRU page table entries (PTEs) in TLB cache in MMU 212. In sum, the HPT translation process requires two steps to convert an EA to an RA. First, an EA is translated to a VA using an appropriate STE. Once the corresponding STE is acquired, the VA is converted into an RA using an appropriate PTE.

When AU 202 needs a translation for an EA, the EA is initially checked against entries in ERAT 204, which facilitates quick resolution when ERAT 204 includes a translation for the EA. If the EA misses ERAT 204, at the request of AU 202, MMU 212 attempts to derive the RA through a dual-step process: an SLB lookup to construct a VA and a lookup in an associated TLB to determine the RA. If the translation misses either the SLB and/or TLB, MMU 212 performs a table-walk of main memory in order to allocate the entry into an associated SLB and/or TLB, which allows the RA to be formed.

In addition to HPT mode, MMU 212 may also support address translations managed through a Radix page table. In general, Radix translations are jointly managed at two levels: guest translation and host translation. Guest (process-scoped) translations are performed on behalf of and under the control of an OS. Host (partition-scoped) translations are executed on behalf of and under the control of a hypervisor.

Figure 3:
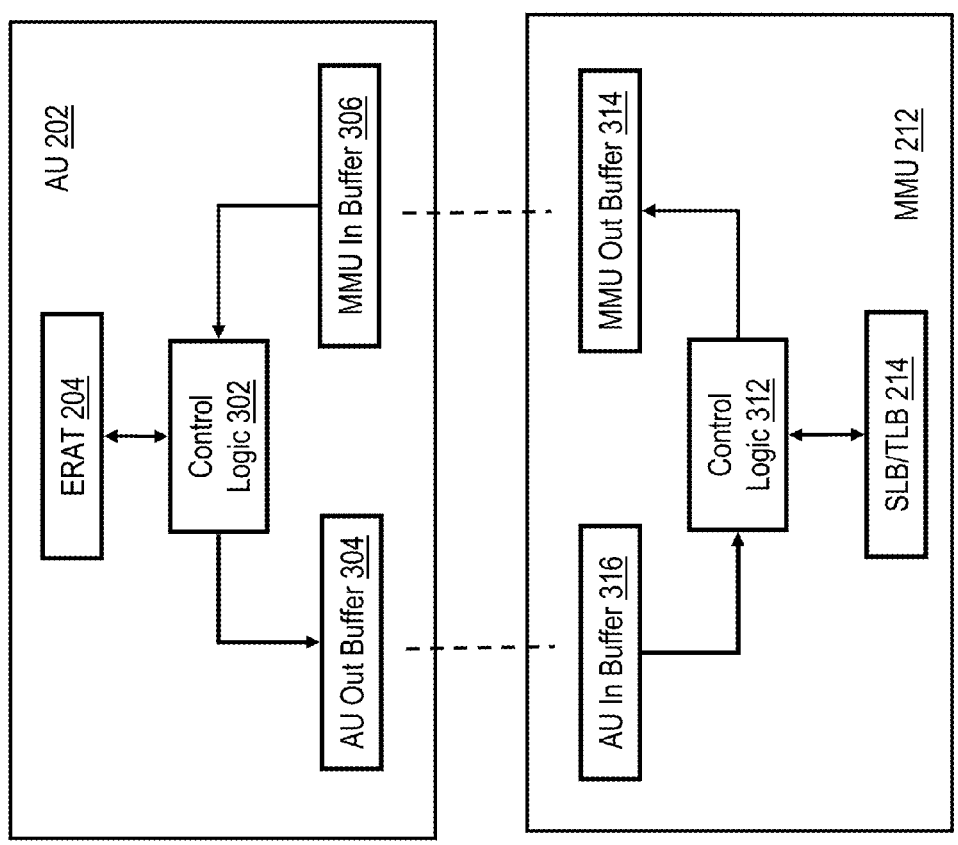
FIG. 3 is a more detailed diagram, in some respects, that illustrates additional relevant components of the AU and MMU of FIG. 2.

With reference to FIG. 3, communication between AU 202 and MMU 212 is facilitated by implementing control logic 302 in combination with 'AU out buffer' 304 and 'MMU in buffer' 306 within AU 202 and control logic 312 in combination with 'MMU out buffer' 314 and 'AU in buffer' 316 within MMU 212. In general, control logic 302 is responsible for forming and processing packets for AU 202 and control logic 312 is responsible for forming and processing packets for MMU 212.

While processing a packet, AU 202 determines whether a translation for a given EA is required. As previously mentioned, AU 202 first performs a lookup in ERAT 204 to determine whether the translation has already been checked out. If the translation is available locally, AU 202 services the translation request from its own cached copy. If the translation is not available (i.e., a miss occurred in ERAT 204), AU 202 issues an address translation check-out request to MMU 212 from buffer 304. The address translation check-out request travels over fabric 220 (e.g., via a 32 B data-only tenure) to MMU 212. Once the translation request arrives at MMU 212, the address translation check-out request is queued in buffer 316 of MMU 212. An arbiter (e.g., implemented in control logic 312) of MMU 212 selects which request to process in an SLB/TLB pipeline (e.g., implemented in control logic 312) of MMU 212. Once an address translation check-out request is granted access to the SLB/TLB pipeline, the SLB/TLB pipeline performs a lookup in the SLB cache (for HPT translations) in order to find the VA corresponding to the EA. MMU 212 searches (e.g., based upon a congruence class (CGC) hash) an SLB directory for a matching effective segment identifier (ESID) for the EA in order to derive a virtual segment identifier (VSID) from the SLB cache, which allows the VA to be formed.

For Radix translations, the SLB cache is bypassed as the guest translation is run against the TLB cache for resolution leading to a guest RA (host VA). When the VA is determined, the VA is used to access the TLB cache. A hash of the VA may be executed in order to isolate the CGC of the TLB cache in order to search the TLB cache directory. Compares are then performed to find a corresponding page table entry (PTE) for the translation request. MMU 212 may search for a matching virtual page number (VPN), logical partition identifier (LPAR_ID), process identifier (PID), page size, hash type, etc. to locate an appropriate PTE.

If a matching PTE is not found, a table-walk state machine (e.g., implemented in control logic 312) may be initiated in order to fulfill the translation request. The table-walk state machine drives reads to memory in order to pull in the STE/PTE for the translation. Once the STE/PTE data arrives, the data is allocated into the SLB and/or TLB, respectively. Once the cache and directory are updated, the table-walk state machine recycles the translation request through the SLB/TLB pipeline on behalf of AU 202 which causes the entry to be re-run through the SLB/TLB pipeline. This re-run causes an SLB/TLB hit to occur, which allows the RA and status for the translation to be returned to AU 202. If an error (segment fault, page fault, etc.) is discovered by the table walk, a fail status may be returned to AU 202 in the address translation checkout response and AU 202 may then send an error interrupt to alert software of the problem. For non-inclusive agents, some additional information may be returned with a response to help with subsequent SLBIE/TLBIE management.

The address translation protocol for AU 202 is partitioned into three primary phases: the check-out of an address translation, the check-in of an address translation, and the invalidation of an address translation, e.g., due to a snoop TLB/SLB cache entry invalidation hit or due to the eviction of an TLB/SLB cache entry in MMU 212.

With reference to FIG. 4, relevant fields of an address translation check-out request 400 (issued by AU 202) are shown. As is illustrated, check-out request 400 includes a data route tag (RTag) field, a function field, a source ID field, an ERAT index field, and an EA field. It should be appreciated that check-out request 400 may include additional fields. Assuming an address translation has not already been checked out, when AU 202 detects an ERAT miss (and there is an available ERAT entry), AU 202 forwards a check-out request to MMU 212 by mastering fabric 220 and issuing check-out request 400. In one or more embodiments, AU 202 masters a 32 B data-only operation on fabric 220, which is logged into buffer 316 of MMU 212.

The data-only operation is routed to MMU 212 via the RTag (which, for example, specifies a destination processor chip ID, a destination MMU ID, and a destination buffer number that corresponds to a slice of a buffer within the MMU that is allocated to AU 202). A value of the function field specifies that the request is a check-out request, a value of the source ID field specifies a source of the request (an originating agent), a value of the ERAT index field specifies an ERAT index where the EA to RA translation is to be stored, and a value of the EA field specifies the EA (or at least a portion of the EA) to be translated. In one or more embodiments, MMU 212 logs the ERAT index in an associated 'InUse' scoreboard on behalf of AU 202 as part of its filtering mechanism for snoop invalidates and local castouts. In one embodiment, a lifespan of an RTag begins with an initial request from AU 202 and continues until a data-only response for the RTag is returned by MMU 212. After the data-only response by MMU 212, the RTag can be used for another request by AU 202.

With reference to FIG. 5, relevant fields of an address translation check-out response 500 (issued by MMU 212) are shown. As is illustrated, check-out response 500 includes an RTag field (that includes a value that specifies a destination AU 202), a function field (that includes a value that specifies the response is a check-out response), a source ID field (that includes a value that identifies MMU 212), an ERAT index field (that includes a value that specifies an ERAT index to store the EA to RA translation), a status field (that includes a value that specifies a status of the check-out), a control field (that includes values that specify, for example, a C-bit for protection checks and one or more page size bits that specify a page size), and an RA field (that includes a value that specifies the RA). It should be appreciated that check-out response 500 may include additional fields and that the fields may specify additional information.

After resolving an address translation request, MMU 212 (identified by a value in the source ID field) returns a translation response to an AU 202 that initiated the request by mastering another data-only operation on the fabric with an RTag associated with AU 202, a corresponding RA, an associated status for the translation request, and a page size for the translation, etc. Once an inclusive agent acquires a translation, the translation is valid until: MMU 212 indicates that the translation must be invalidated; or the inclusive agent checks in the translation (upon completion of processing). For a non-inclusive agent, an address translation is valid until the corresponding non-inclusive agent detects a snoop invalidate hit or until the non-inclusive agent needs to evict the page out of an associated ERAT. MMU 212 snoops check-out requests and performs a lookup of an associated SLB/TLB cache to determine whether the translation already exists.

With reference to FIG. 6, relevant fields of an address translation check-in request 600 (issued by AU 202) are illustrated. As is shown, check-in request 600 includes an RTag field, a function field (includes a value that specifies the request is a check-in request), a source ID field (includes a value that specifies the source of the request), and an ERAT index field (includes a value that specifies the ERAT entry to be invalidated). For example, when AU 202 is finished with a specific address translation that is no longer needed, AU 202 may initiate a check-in request to MMU 212, along with the corresponding ERAT index, in order to check-in the translation. Upon receipt of the check-in request, MMU 212 removes the entry from its 'InUse' scoreboard and clears the corresponding 'InUse' flag(s) from the SLB and/or TLB caches. Checking in an address translation potentially lessens the impact of an invalidation for the translation, as contrasted with allowing an asynchronous forced invalidation at some point in the future (e.g., when MMU 212 snoops a TLBIE/SLBIE or when a TLB/SLB cache entry eviction occurs due to capacity reasons and the corresponding TLB/SLB cache entry has an associated 'InUse' flag set). By clearing the corresponding 'InUse' bit within a given TLB/SLB entry in response to a check-in, the TLB/SLB entry may be invalidated without invoking a back-invalidation sequence with AU 202 in response to detection of a subsequent TLBIE/SLBIE. It should be appreciated that request 600 may include additional fields and that the fields may specify additional information.

With reference to FIG. 7, relevant fields of an address translation check-in response 700 (issued by MMU 212) are illustrated. As is shown, check-in response 700 includes an RTag field (that includes a value that specifies a destination AU 202), a function field (that includes a value that specifies the response is a check-in response), a source ID field (that includes a value that specifies the source of the response), an ERAT index field (that includes a value that specifies the ERAT entry invalidated), and a status field (that includes a value that specifies whether the check-in response is a clean response or a retry response). It should be appreciated that response 700 may include additional fields and that the fields may specify additional information.

In order to check-in a translation, an inclusive AU 202 masters a data-only operation on fabric 220. Similar to the check-out request, AU 202 targets a destination MMU 212 via the RTag field. In order to release the Rtag for the check-in operation, MMU 212 returns a response to the initiating AU 202 in the form of a data-only operation that acts an acknowledgement to the check-in request. MMU 212 clears a corresponding 'InUse' bit in an associated TLB cache when MMU 212 locates a matching entry for the EA, LPAR_ID, PID, etc. Upon detecting an ERAT miss for a local page translation request, an AU 202 selects an ERAT index that will hold the new translation after the miss is serviced. AU 202 evaluates the state of the ERAT index. If the targeted ERAT index is "dirty' (i.e., holds a valid entry for a previous translation), AU 202 casts out the old translation in order to free up the ERAT index for the new translation. In this case, a check-in request is first performed for the old translation. If the targeted ERAT index is "clean" (i.e., no valid entry exists), AU 202 immediately issues a check-out request to MMU 212 in order to retrieve the RA for the new translation. After AU 202 receives a clean check-in response, AU 202 invalidates the targeted ERAT entry and can then re-use the entry. It should be appreciated that non-inclusive agents bypass the check-in phase of the protocol.

With reference to FIG. 8, relevant fields of a raise/lower barrier request 800 (issued by MMU 212) are shown. As is illustrated, raise/lower barrier request 800 includes an RTag field (that includes a value that specifies a destination AU 202), a function field (that includes a value that specifies the request is a raise barrier request or a lower barrier request), and a source ID field (that includes a value that specifies the source of the request). It should be appreciated that request 800 may include additional fields and that the fields may specify additional information.

With reference to FIG. 9, relevant fields of a raise/lower barrier response 900 (issued by an originating AU 202), is illustrated. As is shown, raise/lower barrier response 900 includes an RTag field (that includes a value that specifies a destination MMU 212), a function field (that includes a value that specifies the response is a raise barrier response or a lower barrier response), a source ID field (that includes a value that specifies the source of the response), and a status (that includes a value that specifies if the response is a clean response). It should be appreciated that response 900 may include additional fields and that the fields may specify additional information.

With reference to FIG. 10, relevant fields of an address translation invalidation request 1000 (issued by an originating MMU 212) are shown. As is illustrated, invalidation request 1000 includes an RTag field (that includes a value that specifies a destination AU 202), a function field (that includes a value that specifies the request is an invalidation request), a source ID field (that includes a value that specifies the source of the request), an ERAT index (that includes a value that specifies the ERAT entry to be invalidated), and an invalidate all field (that includes a value that specifies whether all ERAT entries are to be invalidated). It should be appreciated that request 1000 may include additional fields and that the fields may specify additional information.

With reference to FIG. 11, relevant fields of an address translation invalidation response 1100 (issued by an originating AU 202) is illustrated. As is illustrated, invalidation response 1100 includes an RTag field (that includes a value that specifies a destination MMU 212), a function field (that includes a value that specifies the response is an invalidation response), a source ID field (that includes a value that specifies the source of the response), an ERAT index (that includes a value that specifies the ERAT entry invalidated), and a status field (that includes a value that specifies whether the invalidation response was a clean response). It should be appreciated that response 1100 may include additional fields and that the fields may specify additional information.

From the above descriptions it should be appreciated that AU 202 forwards a check-in request (tagged with the ERAT index) to MMU 212 to clear out the residue of an old translation. In at least one embodiment, to improve the back-invalidate procedure (inherently, a long latency event) for snooped invalidates and SLB/TLB castouts with the 'InUse' flag set, it is desirable for an AU 202 to employ an active eviction policy to schedule ERAT castouts before a forced eviction is required by MMU 212. MMU 212 receives the check-in request from AU 202 and proceeds a lookup in an 'InUse' scoreboard to locate a corresponding SLB/TLB entry that maps to a targeted ERAT index. After MMU 212 updates the 'InUse' scoreboard and corresponding 'InUse' flags in the SLB/TLB caches, MMU 212 issues a check-in response to AU 202 for the check-in request. Upon detecting the check-in response, AU 202 clears a valid bit for the old translation at the ERAT index location and forwards a check-out request (tagged with the ERAT index) for a different page to MMU 212.

In at least one embodiment, AU 202 suspends issuing any subsequent requests that might potentially match the page for the new translation until a check-out response is received and the page size is known. In at least one embodiment, AU 202 uses a worst-case page size compare (e.g., a 16 GB page compare) for the function. In response to a check-out request and following a TLB/SLB cache hit or after resolving a TLB/SLB cache miss via a table-walk and cache allocation, MMU 212 stores local cache information in the 'inUse' scoreboard. MMU 212 then routes a check-out response back to AU 202 for the ERAT index. In one or more embodiments, the check-out response includes the RA, the status for the operation, and a page size.

Upon receipt of the check-out response, AU 202 allocates the new page translation into the targeted ERAT index. AU 202 then recycles the original translation request in order to now detect an ERAT hit. Future operations that hit the same page with matching access permissions then encounter a hit in the ERAT of AU 202. A subsequent translation for a page not resident in ERAT results in an ERAT miss and a check-out request to MMU 212 for a predetermined ERAT index.

A page translation is valid for a given ERAT entry until the page is invalidated by MMU 212 or until it is castout of AU 202, as a check-in request in order to make room for a new page translation. In at least one embodiment, MMU 212 returns a qualified control bit (C-bit) to AU 202 that takes into account write permissions pertaining to a page. In one embodiment, the qualified C-bit is only set in a check-out response if a C-bit in the PTE is equal to '1' and writes for AU 202 are allowed. When MMU 212 snoops a TLBIE/SLBIE command from fabric 220 that hits an entry in and associated TLB/SLB cache that has an associated 'InUse' flag set (which means that the translation is currently being used by AU 202) MMU 212 initiates an invalidation sequence with AU 202 to invalidate the translation. In this scenario, MMU 212 accepts the TLBIE/SLBIE operation and protects the page/segment until the invalidation sequence with AU 202 completes. In one or more embodiments, MMU 212 drives an invalidation request to any AU 202 whose InUse' bit is set for a matching SLB or TLB entry, along with the affected ERAT index, which is held within an 'InUse' scoreboard of MMU 212. The invalidation sequence completes when AU 202 responds to MMU 212, which indicates that AU 202 has quiesced by draining all pending operations for any outstanding translations for the targeted ERAT index to fabric 220.

Figure 12:
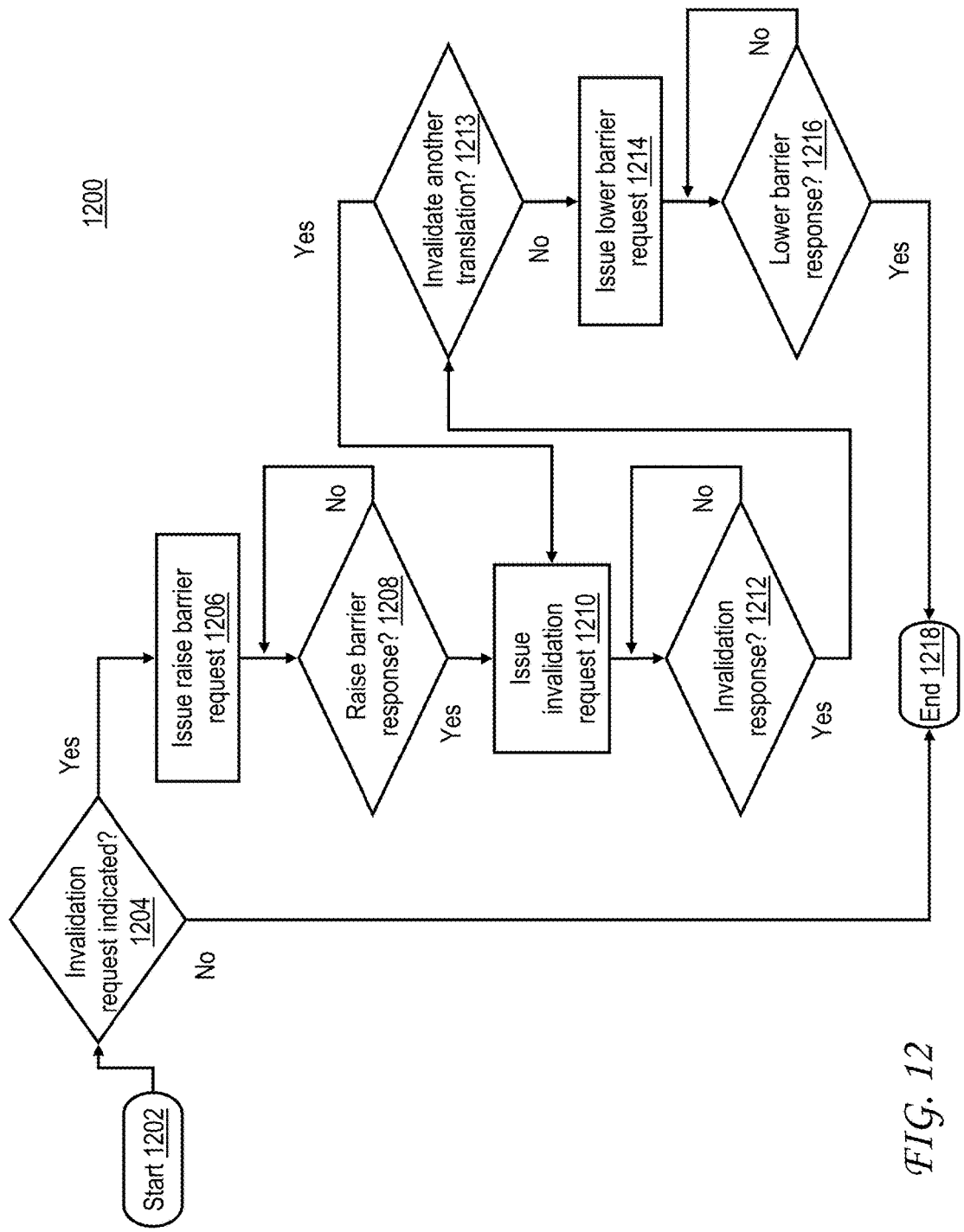
FIG. 12 is a flowchart of an exemplary process implemented by an MMU, configured according to one embodiment of the present disclosure.

With reference to FIG. 12, an exemplary process 1200 that is implemented by an MMU 212, configured according to an embodiment of the present disclosure, is illustrated. In block 1202 process 1200 is initiated, e.g., in response to detection of an operation that may require action of the part of MMU 212. Next, in decision block 1204, MMU 212 determines whether issuance of an invalidation request is indicated in view of the detected operation. For example, issuance of an invalidation request may be indicated in response to a translation lookaside buffer (TLB) cache castout or a segment lookaside buffer (SLB) cache castout. As another example, an invalidation request may be indicated in response to MMU 212 snooping a segment lookaside buffer invalidate entry (SLBIE) or a translation lookaside buffer invalidate entry (TLBIE) command on fabric 220. In response to an invalidation request not being indicated in block 1204 control transfers to block 1218, where process 1200 terminates. In response to an invalidation request being indicated in block 1204 control transfers to block 1206, where MMU 212 issues a raise barrier request on fabric 220. In one embodiment, in order to raise or lower a barrier for an invalidate sequence, MMU 212 masters a data-only operation on fabric 220 that targets AU 202 via an RTag field.

When MMU 212 performs an invalidation sequence due to snooping a SLBIE/TLBIE command on fabric 220 in block 1206, MMU 212 triggers a protection window on behalf of the SLBIE/TLBIE on fabric 220 until MMU 212 clears a valid bit in matching TLB entries that hit against the snoop TLBIE. If the corresponding SLB/TLB entries have their 'InUse' flag set, MMU 212 initiates an invalidation sequence with inclusive agents that have the translation checked out. In this case, inclusive agents that have the translation checked out must drain all pending operations using the translation before MMU 212 releases the TLBIE from its retry loop on fabric 220. When MMU 212 invalidates a translation entry due to a TLB cache eviction, MMU 212 invalidates the old translation from an associated TLB before allowing the new translation to be installed in the TLB. If the old translation has the 'InUse' flag set, MMU 212 initiates an invalidation sequence in order to drain all references in AU 202 to fabric 220.

Next, in block 1208, MMU 212 waits on a raise barrier response from AU 202. Upon receiving the raise barrier request, AU 202 stops sending any new check-out/check-in requests to MMU 212 until it detects a lower barrier request. Check-out/check-in operations that are already in the outbound request queue are sent, as queued requests cannot be pulled back. AU 202 waits for a response from MMU 212 for all outstanding check-out/check-in requests. If table-walk or check-in machines have been started already, MMU 212 allows the machines to finish before providing a response. A table-walk state machine may be forced to abort if a castout of a TLB/SLB cache entry is detected with its 'InUse' flag set. MMU 212 drives a "retry due to invalidate" status for all in-flight operations sourced by AU 202 into its SLB/TLB pipe. Upon receiving a "retry" status, AU 202 may recycle the request after the barrier is lowered. When AU 202 receives responses for all pending check-out/check-in requests, AU 202 issues a raise barrier response on fabric 220 to establish the barrier and to indicate that AU 202 is ready to receive the invalidate. Upon receiving the raise barrier response from AU 202 in block 1208 control transfers to block 1210, where MMU 212 issues an invalidation request to AU 202. Next, in decision block 1212, MMU 212 waits on an invalidation response from AU 202.

Upon receiving the invalidation request, AU 202 compares an ERAT index (or transaction ID for non-inclusive agents) for the invalidation request with any pending check-in requests before invalidating the ERAT entry. If a match is found, the ERAT index is implicitly checked in (i.e., removed from the queue as though the associated operation completed). If an ERAT index is in use by a direct memory access (DMA) read/write machine, AU 202 waits for the corresponding access count for the ERAT index to drain to zero (i.e., such that there are no pending accesses to fabric 220 for the ERAT index). When the invalidation response is received from AU 202 in block 1212, control transfers to decision block 1213. In block 1213, MMU 212 determines whether another translation requires invalidation. In response to another translation requiring invalidation in block 1213 control transfers to block 1210. In response to another translation not requiring invalidation in block 1213 control transfers to block 1214. In block 1214 MMU 212 invalidates one or more associated SLB or TLB entries (dependent upon which cache entry is being invalidated) and updates its 'InUse' flag(s) accordingly. For a given CGC, if MMU 212 still has other CGC members to invalidate with an 'InUse' flag set, MMU 212 may invalidate the other CGC members under the current raised barrier. MMU 212 may amortize the barrier for processing subsequent CGCs if the invalidate is one in which an entire TLB is to be scrubbed (e.g., a TLBIE for all entries or those matching an LPAR ID/PID combination). When MMU 212 finishes cleaning the 'inUse' flags for the CGC, MMU 212 issues a lower barrier request to AU 202.

Next, in decision block 1216, MMU 212 waits for a lower barrier response from AU 202. Upon receiving the lower barrier request from MMU 212, AU 202 issues a lower barrier response to MMU 212. Following issuance of the lower barrier response, AU 202 may resume issuing check-out/check-in requests to MMU 212. Upon receiving the lower barrier response in block 1216 MMU 212 drops its retry window for in-flight operations and control then transfers to block 1218.

Figure 13:
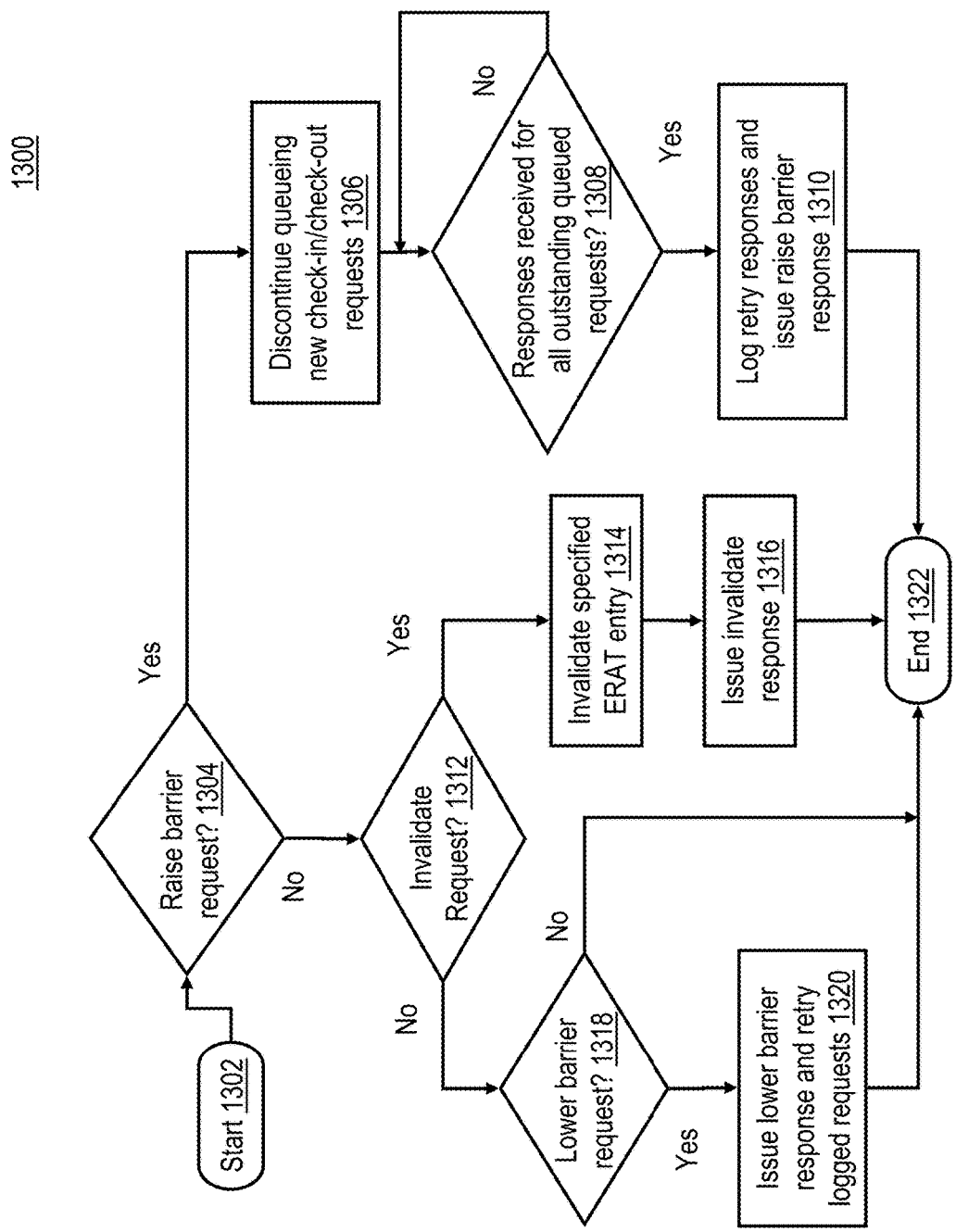
FIG. 13 is a flowchart of an exemplary process implemented by an AU, configured according to one embodiment of the present disclosure.

With reference to FIG. 13, an exemplary process 1300 that is implemented by an AU, configured according to the present disclosure, is illustrated. Process 1300 is initiated in block 1302 in response to, for example, AU 202 receiving a packet. Next, in decision block 1304, AU 202 determines whether the received packet corresponds to a raise barrier request. In response to the received packet corresponding to a raise barrier request control transfers from block 1304 to block 1306. In block 1306 AU 202 discontinues queueing new check-in/check-out requests in buffer 304, but continues to issue any pending requests already queued in buffer 304. Next, in decision block 1308, AU 202 determines whether responses have been received for all outstanding requests. In response to responses not having been received for all outstanding requests control loops on block 1308. In response to responses having been received for all outstanding requests in block 1308 control transfers to block 1310. In block 1310 AU 202 logs retry responses from MMU 212 and issues a raise barrier response on fabric 220. Following block 1310 control transfers to block 1322 where process 1300 terminates.

In response to the received packet not corresponding to a raise barrier request control transfers from block 1304 to block 1312. In block 1312, AU 202 determines whether the received packet corresponded to an invalidation request. In response to the packet corresponding to an invalidation request in block 1312 control transfers to block 1314. In block 1314 AU 202 invalidates a specified ERAT entry.

Next, in block 1316, AU 202 issues an invalidation response on fabric 220. Following block 1316 control transfers to block 1322. In response to the received packet not corresponding to an invalidation request in block 1312 control transfers to decision block 1318. In block 1318 AU 202 determines whether the received packet corresponded to a lower barrier request. In response to the received packet not corresponding to a lower barrier request in block 1318 control transfers to block 1322. In response to the received packet corresponding to a lower barrier request in block 1318 control transfers to block 1320. In block 1320 AU 202 issues a lower barrier response on fabric 220 and then initiates retrying logged requests. Following block 1320 control transfers to block 1322.

It should be appreciated that non-inclusive agents bypass the back-invalidate sequence. Similar to the inclusive agent flow, MMU 212 services check-out requests for non-inclusive agents and returns the corresponding response (e.g., includes status, RA, page size, etc.) to the non-inclusive agent. However, since MMU 212 is not inclusive in this case, MMU 212 does not promote the translation to the 'InUse' scoreboard in order to track pending translations. Instead, invalidations are handled directly by the non-inclusive agent. Upon receiving all check-out responses from MMU 212, a non-inclusive agent compares the in-bound responses against any pending snoop invalidates. If there is a match, the non-inclusive agent discards the check-out response and re-requests the translation at a later time. If there is not a match, the non-inclusive agent stores the check-out response in an associated ERAT. MMU 212 is configured to ensure that a snapshot of pending snoop invalidates completes prior to servicing a given check-out request.

Accordingly, techniques have been disclosed herein that advantageously maintain consistency between address translations in a memory management unit and an inclusive agent.

In the flow charts above, the methods depicted in the figures may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of operating a data processing system including a memory storing a page table, a processor core, a memory management unit circuit (MMU), an accelerator unit circuit (AU), and an interconnect fabric coupling the memory, the processor core, the MMU, and the AU, the method comprising:
    caching, in a first cache in the MMU, translation entries accessed from the page table;
    the AU accessing translation entries from the first cache in the MMU via access requests on the interconnect fabric and caching the accessed translation entries in a second cache in the AU, such that contents of the first cache are inclusive of contents of the second cache;
    based on at least a request snooped on the interconnect fabric, the MMU detecting that one or more translation entries held in the second cache in the AU are to be invalidated, wherein the detecting includes detecting that one or more translation entries held in the second cache in the AU are to be invalidated based on a cache castout from the first cache;
    based on detecting that the one or more translation entries in the second cache are to be invalidated, issuing on the interconnect fabric, by the MMU, a raise barrier request targeting the AU;
    based on detecting, by the MMU on the interconnect fabric, a raise barrier response from the AU to the raise barrier request, the raise barrier response acknowledging a temporary cessation of access requests to access translation entries in the first cache by the AU, the MMU issuing at least one invalidation request to the AU on the interconnect fabric;
    based on detecting, by the MMU on the interconnect fabric, an invalidation response from the AU to each invalidation request issued by the MMU, the MMU issuing a lower barrier request to the AU on the interconnect fabric; and
    based on detecting, by the MMU on the interconnect fabric, a lower barrier response from the AU to the lower barrier request, resuming, by the MMU, handling of the access requests received from the AU.

2. The method of claim 1, wherein detecting that one or more translation entries held in the second cache in the AU are to be invalidated includes detecting that one or more translation entries held in the second cache in the AU are to be invalidated based on the MMU snooping, on the interconnect fabric, a segment lookaside buffer invalidate entry (SLBIE) command or a translation lookaside buffer invalidate entry (TLBIE) command.

3. The method of claim 1, and further comprising the AU, responsive to the raise barrier request, discontinuing queuing of new access requests for the first cache in the MMU until the lower barrier request is received.

4. The method of claim 1, and further comprising the AU waiting for responses from the MMU to all outstanding access requests before issuing the barrier raise response.

5. The method of claim 1, wherein the invalidation request explicitly specifies a cache entry in the second cache to invalidate or that all cache entries in the second cache are to be invalidated.

6. The method of claim 1, and further comprising the AU waiting for all memory accesses that are currently using a cache entry in the second cache that is to be invalidated to complete before invalidating the cache entry in the second cache.

7. A processor for a data processing system including a memory storing a page table and an interconnect fabric, the processor comprising:
    a memory management unit circuit (MMU) including a first cache that caches translation entries accessed from the page table; and
    an accelerator unit circuit (AU) coupled to the MMU by the interconnect fabric, wherein the AU includes a second cache, and wherein the AU is configured to access translation entries from the first cache in the MMU via access requests on the interconnect fabric and cache the accessed translation entries in a second cache in the AU, such that contents of the first cache are inclusive of contents of the second cache;
    wherein the MMU is configured to:
        based on at least the MMU snooping a request on the interconnect fabric, detect that one or more translation entries held in the second cache in the AU are to be invalidated, wherein the MMU detects that one or more translation entries held in the second cache in the AU are to be invalidated based on a cache castout from the first cache;
        in response to detecting that the invalidation requests are indicated, issue a raise barrier request for the AU;
        based on the MMU detecting on the interconnect fabric a raise barrier response from the AU to the raise barrier request, the raise barrier response acknowledging a temporary cessation of access requests to access translation entries in the first cache by the AU, issue at least one invalidation request to the AU on the interconnect fabric;
        based on the MMU detecting on the interconnect fabric an invalidation response from the AU to each invalidation request issued by the MMU, issue a lower barrier request to the AU on the interconnect fabric; and
        based on the MMU detecting on the interconnect fabric a lower barrier response from the AU to the lower barrier request, resume handling the access requests received from the AU.

8. The processor of claim 7, wherein the MMU detects that one or more translation entries held in the second cache in the AU are to be invalidated based on the MMU snooping, on the interconnect fabric, a segment lookaside buffer invalidate entry (SLBIE) command or a translation lookaside buffer invalidate entry (TLBIE) command.

9. The processor of claim 7, wherein the AU, responsive to the raise barrier request, discontinues queuing of new access requests for the first cache in the MMU until the lower barrier request is received.

10. The processor of claim 7, wherein the AU waits for responses from the MMU to all outstanding access requests before issuing the barrier raise response.

11. The processor of claim 7, wherein the invalidation request explicitly specifies a cache entry in the second cache to invalidate or that all cache entries in the second cache are to be invalidated.

12. The processor of claim 7, wherein the AU waits for all memory accesses that are currently using a cache entry in the second cache that is to be invalidated to complete before invalidating the cache entry in the second cache.

13. A data processing system, comprising:
   a data storage subsystem including a memory storing a page table; and
   a processor coupled to the data storage subsystem, wherein the processor includes an accelerator unit circuit (AU) and a memory management unit circuit (MMU) coupled to the AU by an interconnect fabric, wherein the MMU includes a first cache that caches translation entries accessed from the page table and the AU includes a second cache, and wherein the AU is configured to access translation entries from the first cache in the MMU via access requests on the interconnect fabric and cache the accessed translation entries in the second cache in the AU such that contents of the first cache are inclusive of contents of the second cache, wherein the MMU is configured to:
      based on at least the MMU snooping a request on the interconnect fabric, detect that one or more translation entries held in the second cache in the AU are to be invalidated, wherein the MMU detects that one or more translation entries held in the second cache in the AU are to be invalidated based on a cache castout from the first cache;
      in response to detecting that the invalidation requests are indicated, issue a raise barrier request for the AU;
      based on the MMU detecting on the interconnect fabric a raise barrier response from the AU to the raise barrier request, the raise barrier response acknowledging a temporary cessation of access requests to access translation entries in the first cache by the AU, issue at least one invalidation request to the AU on the interconnect fabric;
      based on the MMU detecting on the interconnect fabric an invalidation response from the AU to each invalidation request issued by the MMU, issue a lower barrier request to the AU on the interconnect fabric; and
      based on the MMU detecting on the interconnect fabric a lower barrier response from the AU to the lower barrier request, resume handling the access requests received from the AU.

14. The data processing system of claim 13, wherein the MMU detects that one or more translation entries held in the second cache in the AU are to be invalidated based on the MMU snooping, on the interconnect fabric, a segment lookaside buffer invalidate entry (SLBIE) command or a translation lookaside buffer invalidate entry (TLBIE) command.

15. The data processing system of claim 13, wherein the AU, responsive to the raise barrier request, discontinues queuing of new access requests for the first cache in the MMU until the lower barrier request is received.

16. The data processing system of claim 13, wherein the AU waits for responses from the MMU to all outstanding access requests before issuing the barrier raise response.

17. The data processing system of claim 13, wherein the invalidation request explicitly specifies a cache entry in the second cache to invalidate or that all cache entries in the second cache are to be invalidated.

* * * * *